(12) United States Patent
Kintzley et al.

(10) Patent No.: US 8,255,799 B2
(45) Date of Patent: Aug. 28, 2012

(54) DYNAMIC ACTION RECORDER

(75) Inventors: Randy Kintzley, Novato, CA (US);
Hans-Frederick Brown, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 967 days.

(21) Appl. No.: 12/040,679

(22) Filed: Feb. 29, 2008

(65) Prior Publication Data

US 2009/0222726 A1 Sep. 3, 2009

(51) Int. Cl.
*G06F 3/00* (2006.01)
(52) U.S. Cl. ........ 715/704; 715/762; 715/808; 715/809; 715/810; 715/841; 715/853
(58) Field of Classification Search .................... 715/704
See application file for complete search history.

(56) References Cited

U.S. PATENT DOCUMENTS

| | | | |
|---|---|---|---|
| 5,070,534 A * | 12/1991 | Lascelles et al. ............. | 715/764 |
| 5,621,877 A | 4/1997 | Neumann et al. | |
| 5,867,163 A * | 2/1999 | Kurtenbach ................ | 715/840 |
| 6,108,668 A | 8/2000 | Bates et al. | |
| 6,111,575 A | 8/2000 | Martinez et al. | |
| 6,208,341 B1 | 3/2001 | van Ee et al. | |
| 6,434,629 B1 | 8/2002 | Stearns et al. | |
| 6,466,240 B1 * | 10/2002 | Maslov ......................... | 715/234 |
| 6,608,623 B1 | 8/2003 | Gerlovin et al. | |
| 6,912,692 B1 | 6/2005 | Pappas | |
| 2001/0049704 A1 | 12/2001 | Hamburg et al. | |
| 2006/0053126 A1 | 3/2006 | Baca et al. | |
| 2009/0044110 A1 * | 2/2009 | McLean ........................ | 715/704 |
| 2009/0103769 A1 * | 4/2009 | Milov et al. ................... | 382/100 |
| 2009/0172533 A1 * | 7/2009 | Hamzaoui et al. ............. | 715/704 |

OTHER PUBLICATIONS

Final Office Action dated Jan. 27, 2012, U.S. Appl. No. 12/426,474.
Amendment Under 1.114 and Interview Summary filed Mar. 1, 2012, U.S. Appl. No. 12/426,474.
U.S. Office Action mailed Aug. 17, 2011, U.S. Appl. No. 12/426,474, filed Apr. 20, 2009.

* cited by examiner

*Primary Examiner* — Doon Chow
*Assistant Examiner* — Anil Kumar
(74) *Attorney, Agent, or Firm* — Gates & Cooper LLP (57) ABSTRACT

A method, apparatus, and article of manufacture obtain user input during a playback of a macro. A series of user actions are recorded in the form of a macro. A representation of the user actions is displayed. The representation provides nodes that each represent the user actions. One of the nodes is selected and configured by the user to request additional user input relating to a parameter of the selected node during playback of the macro. The macro is played back and automatically pauses at the selected node. User input is obtained and the macro automatically continues execution utilizing the user input for the parameter of the selected node. Additionally, one or the user actions includes a selection of objects. As part of the recorded macro, references to the selected objects are stored in a non-graphical manner. During playback, objects are selected based on the stored references.

16 Claims, 7 Drawing Sheets

DYNAMIC ACTION RECORDER

BACKGROUND OF THE INVENTION

1. Field of the Invention

The present invention relates generally to macros, and in particular, to a method, apparatus, and article of manufacture for dynamically recording and using a macro in a customizable manner.

2. Description of the Related Art

Users often repeat a series of steps in the course of a computer project (e.g., drawing project, word processing project, etc.). Repeating the same set of steps over and over again is time consuming and often error prone due to the amount of interaction. Recording a series of steps and reusing the recording is a much more efficient way of achieving the same goal. Such a recording is commonly referred to as a "macro". As used herein, a macro refers to a series of user commands, actions, or keystrokes that have been recorded.

In a computer drawing environment, a user might want to repeat a series of actions that includes creating a circle, using a square to enclose the circle and then rotating them both ninety (90) degrees. If the size of the shapes is to be different each time the series of steps is performed, it would require that the user manually select each shape and change the scale after each macro cycle was complete. This would require a great deal of user interaction.

In addition, most macros that rely on an action (e.g., selection of an object or text) rely on a user to select the object on which the action is to be performed. Ordinarily, when recording a macro and a mouse is used to select an object, the selection is merely recording a mouse click. Thus, when playing back a macro at a later time, the selection or mouse click may miss the object. Accordingly, the user may be required to manually select an object or re-record a macro so that the selection hits the object. In this regard, in prior-art software, the playback will often cause an error or simply fail to produce desired results.

Accordingly, what is needed is a method, apparatus, and article of manufacture for recording a macro with flexible, reliable, and consistent playback results.

SUMMARY OF THE INVENTION

To overcome the problems of the prior art, one or more embodiments of the invention present a method, apparatus, and article of manufacture for providing user input during a playback of a macro. A macro consisting of a series of user actions (e.g., creating geometry in a drawing program) is recorded. A representation of the user actions is displayed to the user. The representation includes one or more nodes that each represent one or more of the user actions in the series. An example of such a representation includes an action tree illustrating the user actions arranged in a hierarchical manner with each node representing a command (e.g., circle command, rectangle command, move command, etc.) and parameters for the commands as subsets of each node (e.g., center point coordinates and radius for circle command, coordinates for two points of the rectangle command, selected objects and coordinates for new location for move command).

The user selects one of the nodes and configures the selected node to request user input relating to a parameter of the selected node during play back of the macro. Such user input may be for any parameter of a node/command (e.g., an identification of a location in a drawing, a size of a geometry, etc.). The macro is then played back (e.g., by the user triggering playback via keyboard controls, menu selection, or other known trigger). The macro is automatically (e.g., without additional user action) paused at the selected node (during playback). User input is then obtained in accordance with the configuring. Once user input is obtained, the macro may automatically (e.g., without addition user action) continue executing. However, rather than using the original parameters for the selected nodes, the user input is utilized for the parameter.

In addition, the series of user actions may include creating multiple geometries in the drawing program. Embodiments of the invention may also maintain the relative position of the multiple geometries with respect to each other during playback of the macro. To maintain the relative positioning, a vector offset between two of the geometries is generated and stored during the recording. The vector offset is used to maintain the relative positioning during playback of the macro.

In one or more additional embodiments of the invention, objects selected in a macro may be reliably played back. In such an embodiment, the user actions stored in the macro include a selection of one or more objects (e.g., geometry in a drawing program) displayed on a display device. As part of the recorded macro, references to the selected objects are stored in a non-graphical manner (e.g., at a database level). During playback, objects are selected based on the stored references and not based on graphical selection operations.

Such non-graphical storage may include determining whether the one or more selected objects are newer than a most recently created object (e.g., by comparing object identifiers that are created sequentially for each object). Thereafter, if a selected object is newer than the most recently created object, an offset is generated and stored as the reference. Such offsets consist of the difference between the object identifiers of the most recently created object to the selected object.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention may also be referred to as a dynamic action recorder. The invention is dynamic because the actions are recorded and configured dynamically by the user without any programming capability or knowledge on behalf of the user. The invention allows a user to record steps and re-use these steps with several very unique additions.

In one or more embodiments, a user can view the steps of a recorded macro and change the parameters at any stage of the macro. For example, if a user desires to change the radius of a circle being created in a macro, the user may easily accomplish such a playback option with very few mouse clicks. In the prior art, the user would have been required to use the macro as is, then select and modify the circle and any other geometry that was dependent on the circle.

Embodiments of the invention also allow the user to pause the playback at any desired location and provide new input.

In addition, most macros that rely on an action rely on a user to select the object on which the action is to be performed. Ordinarily, when a mouse is used to select an object, the selection or mouse click may miss the object because of the selection is merely recording a mouse click. Inferred selection in the dynamic action recorder allows a user to specify the object created by the macro directly in the macro itself. The user does not have to manually select an object or re-record the macro so that the selection hits the object.

Hardware and Software Environment

Figure 1:
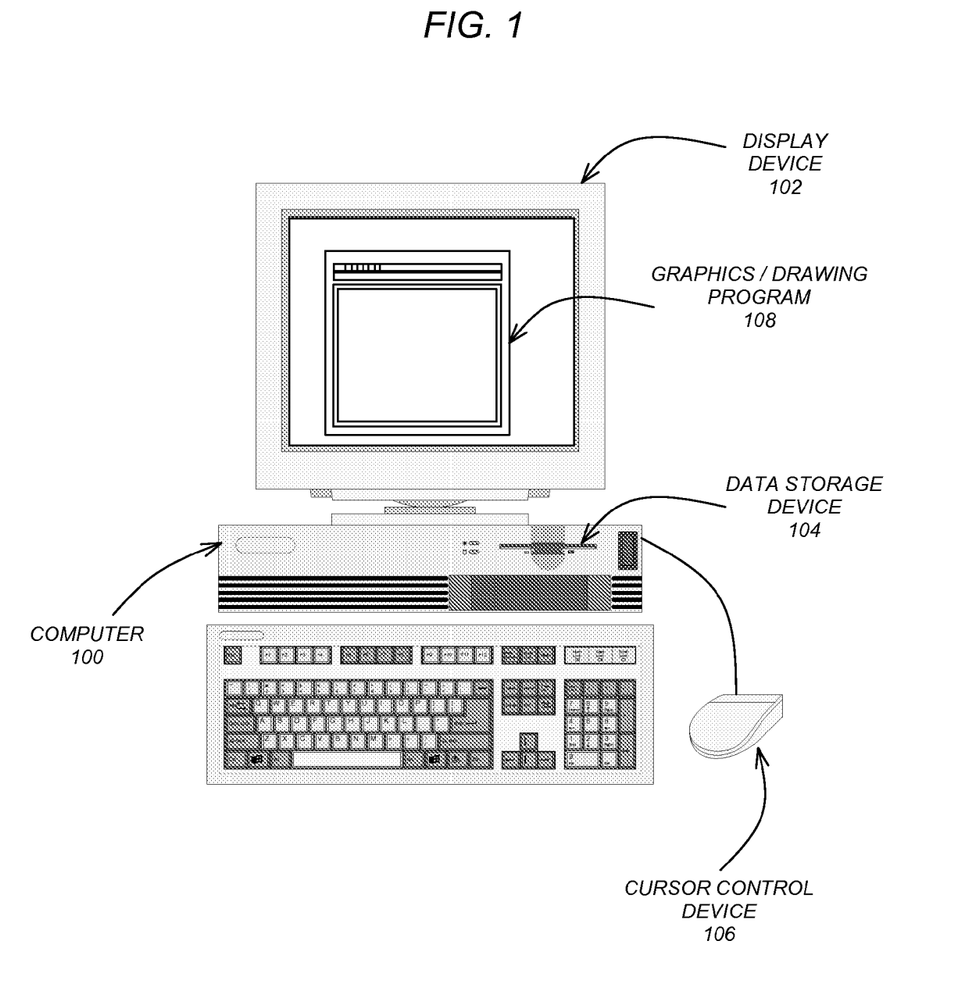
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108, wherein the graphics program 108 is represented by a window displayed on the display device 102. Alternatively, embodiments of the invention may be implemented in any type of program 108 that utilizes macros including but not limited to graphics programs, word processing applications, spreadsheets, etc. Further, embodiments of the invention may also be implemented in plug-ins or modules that are utilized in conjunction with other programs (e.g., a paint or drawing program within a word processing application). Generally, the program (graphics or otherwise) 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc.

In one or more embodiments, instructions implementing the program 108 are tangibly embodied in a computer-readable medium, e.g., data storage device 104, which could include one or more fixed or removable data storage devices, such as a zip drive, floppy disc drive, hard drive, CD-ROM drive, tape drive, etc. Further, the program 108 is comprised of instructions which, when read and executed by the computer 100, causes the computer 100 to perform the steps necessary to implement and/or use the present invention. Program 108 and/or operating instructions may also be tangibly embodied in a memory and/or data communications devices of computer 100, thereby making a computer program product or article of manufacture according to the invention. As such, the terms "article of manufacture" and "computer program product" as used herein are intended to encompass a computer program accessible from any computer readable device or media.

Those skilled in the art will recognize that the exemplary environment illustrated in FIG. 1 is not intended to limit the present invention. Indeed, those skilled in the art will recognize that other alternative environments may be used without departing from the scope of the present invention.

Computer-Implemented Graphics Program

Figure 2:
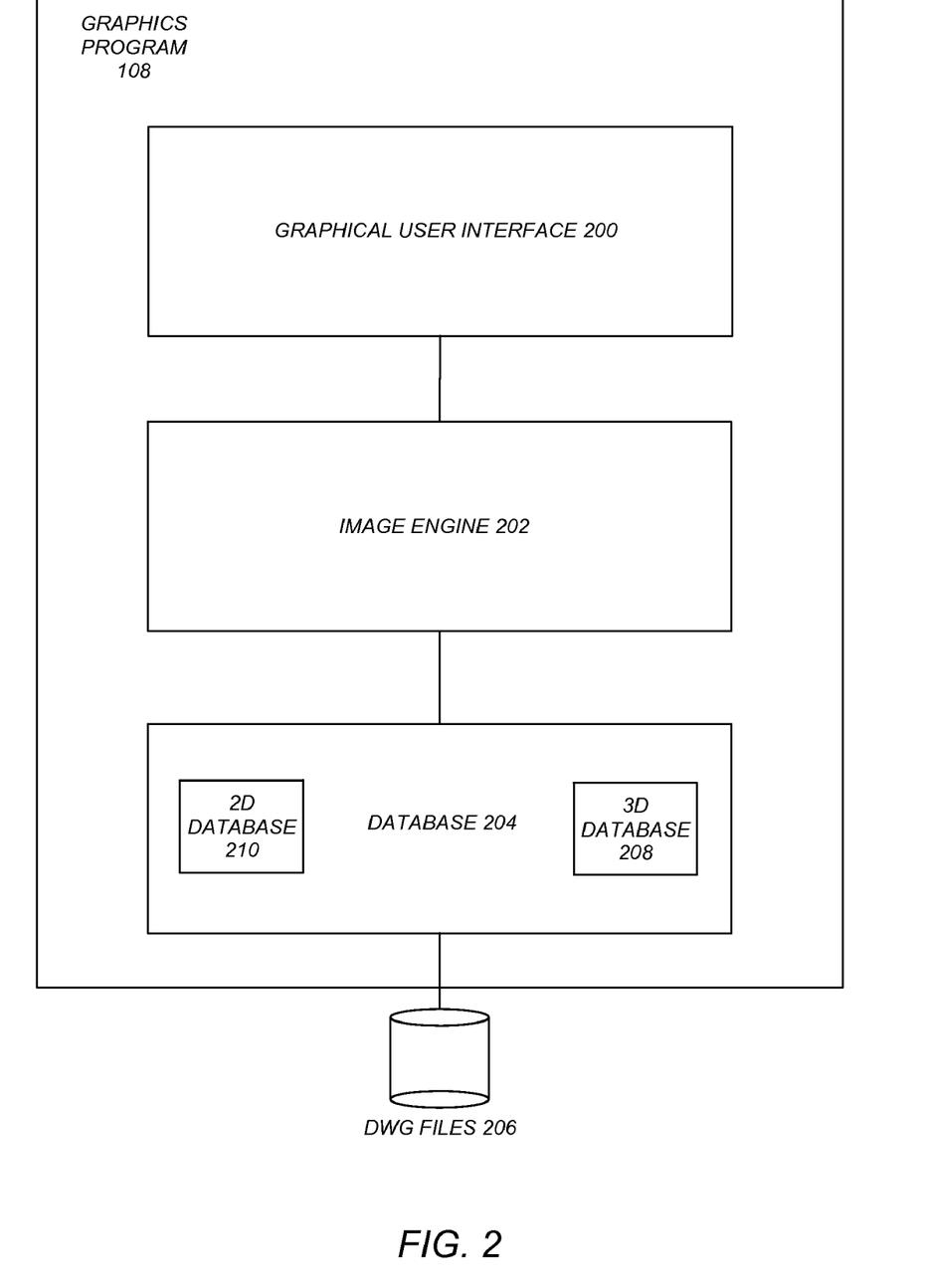
FIG. 2 is a block diagram that illustrates the components of a graphics program in accordance with one or more embodiments of the invention.

FIG. 2 is a block diagram that illustrates the components of a graphics program 108 in accordance with one or more embodiments of the invention. There are three main components to a graphics program 108, including: a Graphical User Interface (GUI) 200, an Image Engine (IME) 202, and a DataBase (DB) 204 for storing objects in Drawing (DWG) files 206.

The Graphical User Interface 200 displays information to the operator and provides the functionality for the operator's interaction with the graphics program 108.

The Image Engine 202 processes the DWG files 206 and delivers the resulting graphics to the monitor 102 for display. In one or more embodiments, the Image Engine 202 provides a complete application programming interface (API) that allows other computer programs to interface to the graphics program 108 as needed.

The Database 204 is comprised of two separate types of databases: (1) a 3D database 208 known as the "3D world space" that stores 3D information; and (2) one or more 2D databases 210 known as the "2D view ports" that stores 2D information derived from the 3D information.

Software Embodiment Details

One or more embodiments of the invention are implemented in a program 108 (graphics or otherwise) and present key innovations that provide flexible macro playback options and more reliable and consistent playback results. The innovations include the ability to provide new input during playback, relative coordinate entry during playback, and reliable playback of object selection.

Provide Input During Playback

Often times, a user may desire the ability to provide input during playback of a macro. For example, the user may desire to specify a new location to begin executing a macro (e.g., a specific location on the screen). In such an example, the user may not remember to place the cursor at the desired location in advance of such macro execution. Alternatively, in a drawing program example, the user may not have the ability to specify a location to begin drawing a geometric shape. In such prior art, the user may be required to execute a macro followed by the manual selection of the elements created by the macro and a click-drag movement to relocate the objects to the desired screen location. In yet another prior art embodiment, multiple objects may be presented on the screen while the macro utilizes a selected one of the objects. In such an embodiment, the macro may either fail to execute for lack of a selected object or may utilize a default selection such as the most recently created shape. With all of these prior art examples, the user lacks the flexibility to pause playback at a desired location in the macro and provide new input at specific points within the sequence.

One or more embodiments of the invention solve the prior art problems and allow the user to parameterize a macro, provide user input, and achieve different results each time the macro is executed. For example, the user may desire to draw some geometry multiple times with the location and size of some of the components varying with each execution.

Embodiments of the invention allow the user to record the sequence and then specify that playback will pause for new input at the desired locations. Such capability a quick and easy way to automate the portions that are repetitive while still providing enough flexibility to use the macro in many different scenarios.

Figure 3:
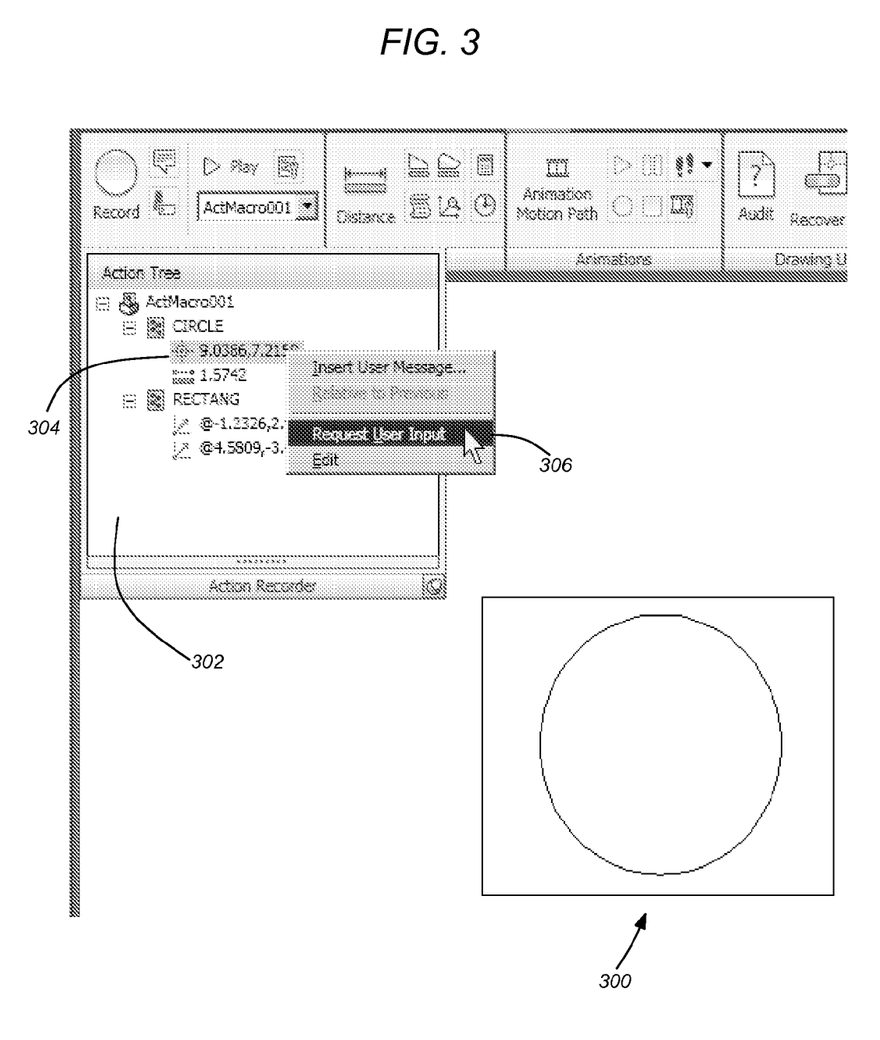
FIG. 3 is a screen shot of a graphical user interface used to provide new input during playback of a macro in accordance with one or more embodiments of the invention.
Figure 4:
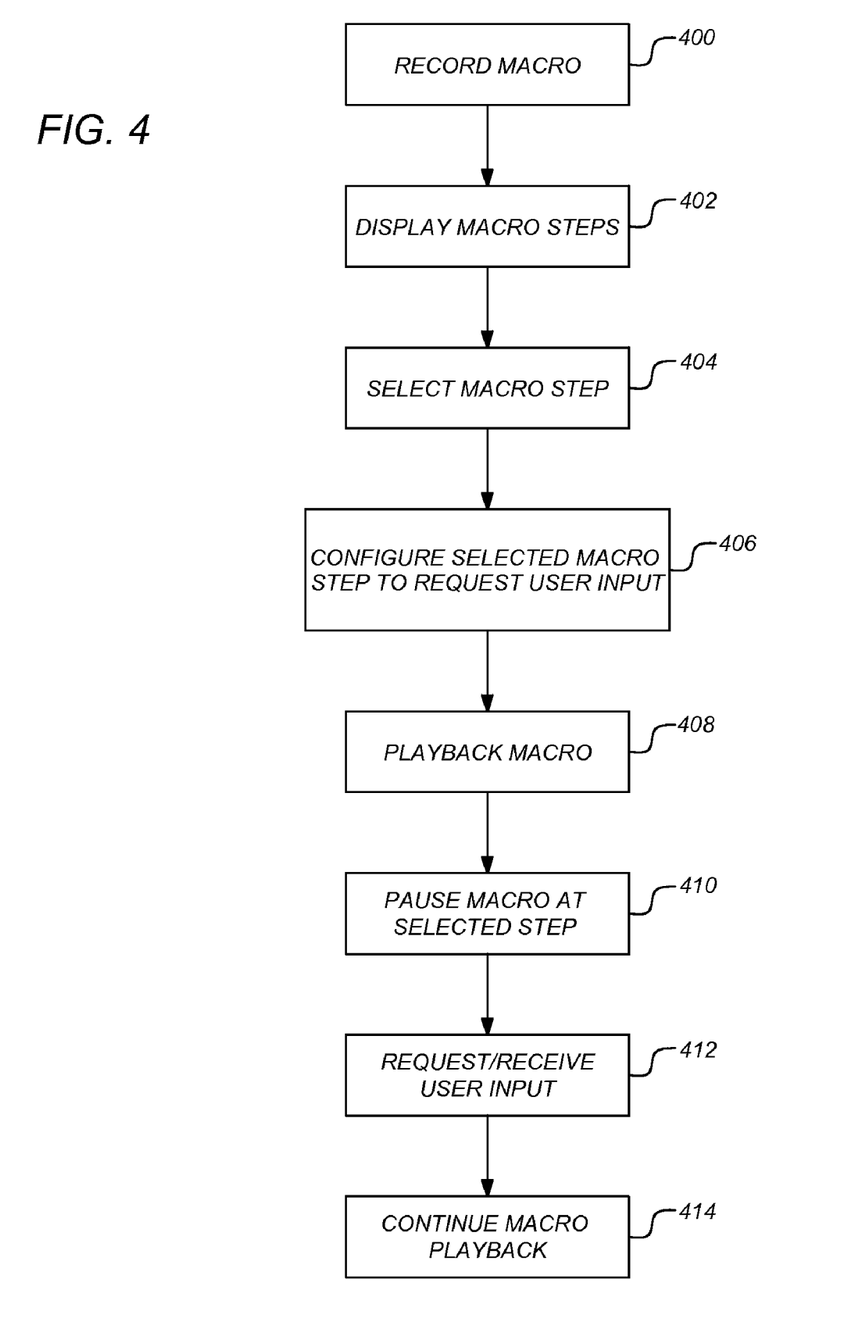
FIG. 4 is a flow chart illustrating the process of configuring and utilizing new user input during playback of a macro in accordance with one or more embodiments of the invention.

FIG. 3 is a screen shot of a graphical user interface used to provide new input during playback of a macro in accordance with one or more embodiments of the invention. FIG. 4 is a flow chart illustrating the process of configuring and utilizing new user input during playback of a macro in accordance with one or more embodiments of the invention. At step 400, a macro (i.e., a series of steps for performing a desired action) is recorded. In FIG. 3, a series of steps include the creation of a circle followed by the creation of a square/rectangle to enclose the circle as illustrated at 300.

At step 402, the macro steps are displayed. Referring to FIG. 3, such steps can be displayed in a hierarchical manner such as in an action tree 302.

At step 404, a particular macro step at which the user desires to obtain user input is selected. Such a selection may be performed by moving a cursor (e.g., using a cursor control device such as a mouse or tablet/stylus) over the desired step and clicking the left or right mouse button (or tapping a stylus). Alternatively, a series of menu based steps may be utilized to select the particular macro step. In FIG. 3, step 304 within the circle has been selected. Step 304 is the step that identifies the center location of the circle.

At step 406, the user configures the selected macro step 304 to request user input. As illustrated in FIG. 3, once step 304 has been selected, a popup menu may be activated to allow the user to identify whether a message should be displayed to the user or to request user input 306. By selecting "Request User Input" 306, the user has identified step 304 which identifies the center location of the circle to be replaced with the location input by the user in response to the request.

Further, whichever step 304 is selected by the user may change the type of input requested from the user during playback. For example, a diameter of the circle, a location of one edge of the rectangle, a length of one side of the rectangle, etc. may all be input that is requested from the user. To provide flexibility to the user that is recording the macro, once the user has elected to request user input 306, further options may be presented for the user's selection and use. Such options may include the ability to enable graphic or text based input during a playback operation. For example, the user recording the macro may configure the macro to request the user to type in coordinates, select a location with a cursor control device, enter a distance, select a distance, display a slider control, display a series of radio buttons for selection, display a drop-down box, etc. In this regard, any type of information or dialog box with a variety of controls may be utilized to obtain user based input. Embodiments of the invention are not intended to be limited to the graphical controls that are displayed or the ability for the user to determine which types of graphical controls are displayed and utilized during playback. Further, the user recording the macro can establish default settings/inputs or limit the amount of choices available during playback as desired.

Once the user has completed configuring the requested user input 306, the configuration portion of the macro may be complete. Accordingly, at step 408, the user (or another user utilizing the macro) opts to play/playback the macro.

At step 410, during playback, the macro automatically (i.e., without additional user input) pauses/stops at the previously selected/identified step.

Figure 5:
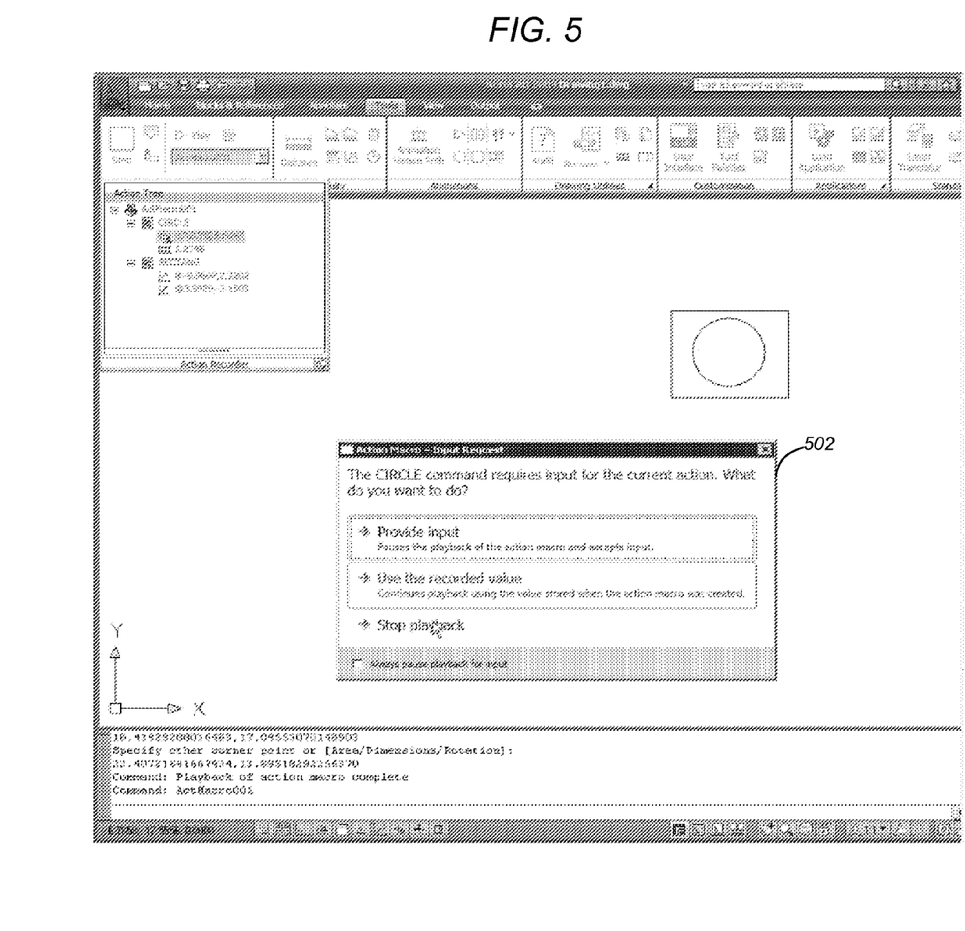
FIG. 5 illustrates an example of a window displayed during playback of the macro configured in FIG. 3 in accordance with one or more embodiments of the invention.

At step 412, user input is requested and received. For example, the user may be presented with a series of options including: "Provide Input", "Use the Recorded Value", or "Stop Playback". FIG. 5 illustrates an example, of a window displayed during playback of the macro configured in FIG. 3. As illustrated, the input request may prompt the user via dialog box 502. Dialog box 502 indicates that the circle command requires input for the current action and asks the user what he/she wants to do. The first choice to provide input pauses the playback of the action macro and accepts input. The second choice to use the recorded value continues playback using the value stored when the action macro was created. The third choice stops the playback.

If the user elects choice one and provides input, the user may have several input methods for identifying the center of the circle including clicking the mouse (or tapping a stylus) at the desired center location, inputting text based coordinates, or any other method of providing input for the desired macro action.

Once the input has been received or the recorded value has been selected, macro playback will continue (e.g., automatically without any additional input from the user) at step 414. Accordingly, embodiments of the invention allow the user to parameterize the macro (e.g., into a series of discreet steps which each may/may not require input parameters) and get different results each time it is used. For example, assuming a user desires to draw some geometry multiple times, but the location and size of some of the components varies each time. The user can record the sequence and then specify that playback will pause for new input at the desired locations. This provides a quick and easy way to automate the portions that are repetitive while still providing enough flexibility to use the macro in many different scenarios. Accordingly, the user can pause a macro in multiple locations and indicate that user input is desired without having any knowledge base regarding programming or programming languages.

Relative Coordinate Entry During Playback

When recording a macro, one of the steps may include identifying a location/coordinates for a shape/geometry (e.g., a center of a circle, a side of a rectangle, etc.). In addition, the user also identifies a second location/coordinates for a second shape/geometry. For example, referring to FIG.3, the user may draw a circle followed by a rectangle that encloses the circle. However, when playing back the macro, the two shapes may be drawn in the original recorded location. When the user attempts to move the shapes, he/she must manually select both shapes to maintain their relative position with respect to each other.

Alternatively, in accordance with the new user-input during playback option described above, the user may elect to specify the location/coordinates for one of the two shapes/geometries. If the location of only one shape/geometry is specified, the second shape/geometry may be drawn in the original location. Thus, to maintain the relative position of one shape with respect to a second shape, both shapes must again be manually selected and moved (e.g., after completion of the macro playback). Alternatively, the user would be required to re-specify the rectangle location during playback (which may not match the relative location of the two shapes/geometries created when the macro was originally recorded). Thus, multiple different instances of the two shapes/geometries may have differing relative positioning.

In accordance with one or more embodiments of the invention, when new coordinate input is provided during playback, geometry and points that follow that input are shifted accordingly. Such an embodiment provides an intuitive and flexible way to control playback behavior.

For example, consider the following sequence:
Start Recording
Draw a circle
Draw a rectangle around the circle
Stop recording Assume that when the user plays the macro back, the user desires the flexibility to specify a new location for all of the created geometry. In accordance with the invention, the user (that is recording the macro) can simply specify that the macro pause and request new input that prompts for the center point of the circle. The rectangle that is drawn afterwards will shift accordingly. Thus, the same sequence of steps specified in FIG. 3 and FIG. 4 are utilized while maintaining the relative positioning of the two geometries.

In view of the above, during playback (e.g., step 408), the macro is paused at step 410 and the user is prompted to pick a center point for the circle at step 412. Once the point has been provided, the macro continues on (at step 414) and automatically completes the circle command and draws the rectangle. The key advantage is that the rectangle is drawn around the new circle location, and not in the original recorded location. In other words, the rectangle automatically shifts to maintain the same relative position with respect to the circle. Without this functionality, the user would have to re-specify the rectangle location during playback.

To enable the ability to maintain relative positioning of the two geometries, embodiments of the invention store (as part of the macro) the offset in vector form representing the relative positioning between the geometries created in the macro. Such vector offsets may originate from the point/coordinates where the macro is initiated or may be relative to any shape drawn as part of the macro. Accordingly, vector arithmetic is utilized to both create the offset information during recording and to recreate the relative positioning during playback. Thus, whenever a second object is created as part of a macro, the offset in vector from between the two objects is also generated and stored. In this manner, the relative position of the two or more objects with respect to each other is maintained. Thereafter, the vector offset is utilized during a playback operation.

In other words, during the macro recording process, once a geometry location/coordinates is specified, with any subsequent geometry that is created or moved, the system also stores a vector (i.e., offset) from that location/coordinates that is utilized during playback. Consequently, if the user opts to specify a new location for a geometry in the macro (as described above), any subsequent geometry that is created may be moved relative to the new location based on the stored vector (i.e., offset). Further embodiments may also adjust any previously created geometry to accommodate the newly specified location (if possible)(e.g., by pausing the macro and prompting the user to elect whether to move the location of previously created geometry to accommodate the newly specified location).

In addition to the above, embodiments of the invention may permit the user to elect whether to utilize absolute coordinates (i.e., coordinates utilized during the macro recording process) or to maintain the relative positioning.

Reliable Playback of Object Selection

Due to a large range of issues, on-screen object selection is prone to error during macro playback. For example, replaying selection pick-points and window points can often fail to produce a desired selection set. Varying conditions such as screen resolution, view direction, application window location, and configuration settings that control selection behavior can all affect the playback of selection picks. The pick-points may miss geometry and fail to yield a selection set at all, or the replayed points can potentially select unintended geometry.

As an example, when recording a macro, the user may draw several objects/geometries. Further, as part of the macro, the user may draw a selection box to select one or more of the geometries. However, if the user specifies a new location to begin drawing the objects (as described above), when the selection box is drawn, additional undesirable objects in the background may be selected.

One or more embodiments of the invention avoid many of these problems by using a non-graphical technique for object selection. In this regard, the user recording the macro may have the option of using a non-graphical technique for selecting objects that were created within the scope of a recording. This option avoids many of the problems associated with on-screen selection.

Figure 6:
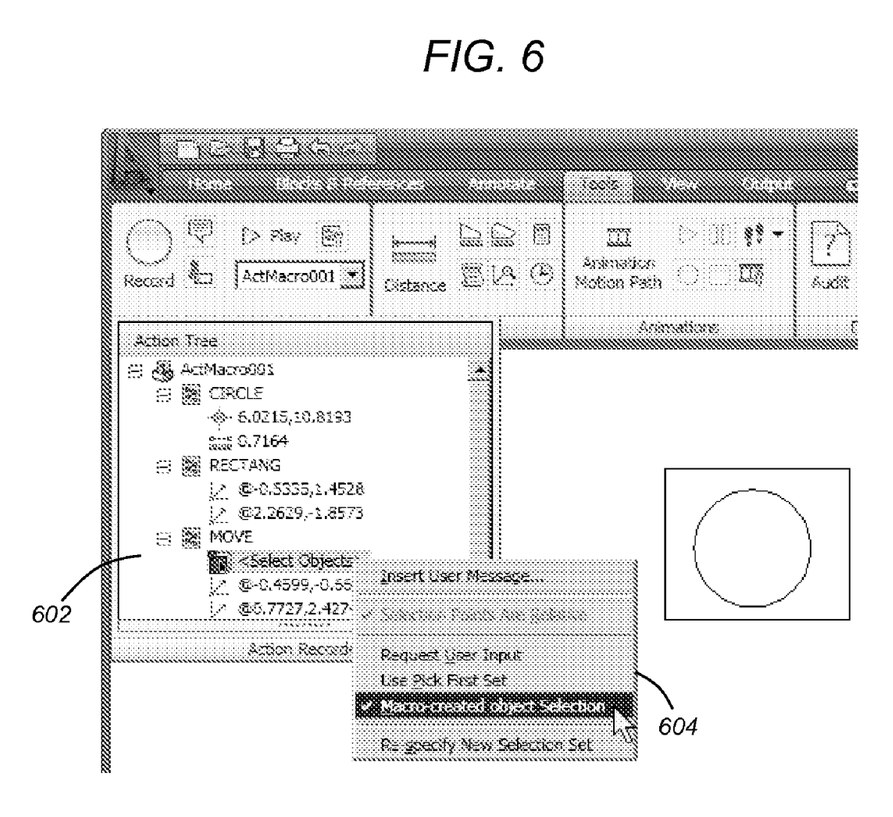
FIG. 6 illustrates a graphical user interface utilized to configure object selection when recording a macro in accordance with one or more embodiments of the invention.

FIG. 6 illustrates a graphical user interface utilized to configure object selection when recording a macro in accordance with one or more embodiments of the invention. The action tree 602 illustrates the various steps recorded in a macro including the creation of a circle, the creation of a rectangle enclosing the circle, and the movement of certain selected objects. During the move step, objects are selected followed by an indication of coordinates/offsets for moving the selected objects. The user has selected the "Select Objects" action for configuration. Once selected (e.g., via a click of a right-mouse button or keyboard controls), the user is presented with menu 604 to further configure the step. Options include inserting a message to the user, requesting user input (e.g., to select objects during playback), using a pick first set (e.g., using objects that were previously selected), macro-created object selection, or re-specify a new selection set.

If the user activates the menu option for "macro-created object selection", a checkmark may appear adjacent the entry. Such a selection configures the macro to select those objects that were created as part of the macro execution. In other words, objects that are in the background and were not created when the macro was played back/executed are not included as part of the selection set. In this regard, if the user moves the location/coordinates where the macro is executed, objects in the background of the new location will not be selected during the move operation.

Figure 7:
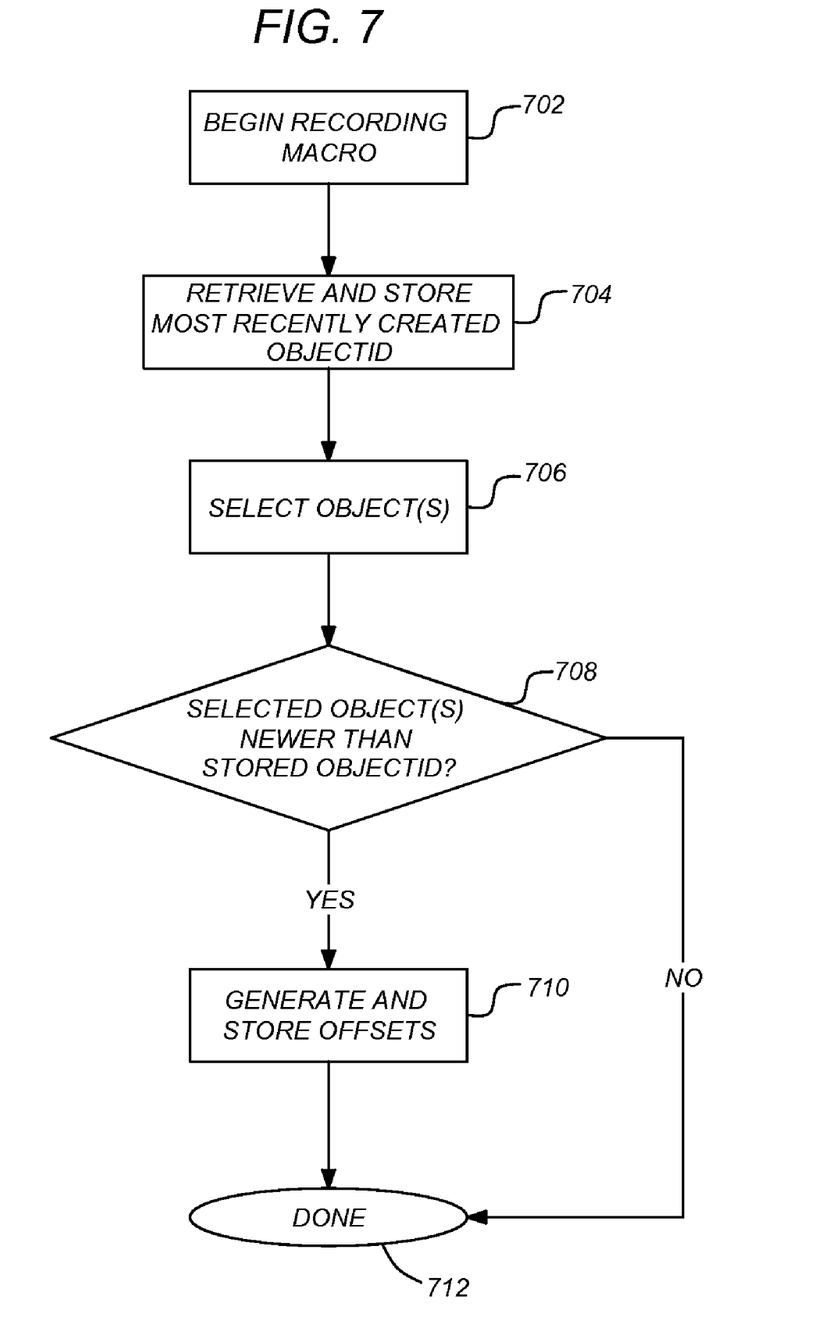
FIG. 7 illustrates the macro recording process used to enable reliable playback of object selection in accordance with one or more embodiments of the invention.

Such an innovation uses object creation tracking to select objects at a database level rather than relying on graphical based selection. FIG. 7 illustrates the macro recording process used to enable reliable playback of object selection in accordance with one or more embodiments of the invention. Every object in a drawing file (e.g., each object in a DWG™ file produced by an AutoCAD™ application [available from the assignee of the present invention]), may have a database object identifier (object ID). Thus, objectIDs are utilized to identify all of the objects in a drawing. Such objectIDs are assigned in a sequential manner during object creation. If the system were to merely record the objectID for each object selected, then the objects created when the macro was recorded would be selected every time the macro is played back (i.e., the same objectID would be used during playback as that during object creation). To select objects created during the macro playback (and not created when the macro was recorded and to ensure accurate selection of the objects), offsets are utilized.

At step 702, the user begins recording a macro. At step 704, at the beginning of the recording process, the objectID for the most recently created object is retrieved and stored. At step 706, one or more objects are selected. For each object that is selected, a determination is made at step 708 regarding whether the selected object's objectID is newer than the stored objectID. If the selected object is newer, then an offset (i.e., from the stored objectID to the selected object objectID) is generated and stored at step 710. Alternatively, if the selected object is older than the most recently created object, the process does not store the offset. Once the macro recording process is complete the process is done at step 712.

When playing back the macro, the most recently created objectID is again retrieved (at the beginning of the playback operation). Thereafter, when the selection process is initiated, the stored offset values are utilized to select the objects based on the most recently created object. Using the offsets in this manner, when the macro is played back, rather than graphically selecting the various objects (e.g., using a selection box or pick-points), the offset from the first object created in the macro playback is used to select the objects. Accordingly, errors associated with the graphical selection of objects are avoided. Further, when this option is used, the potential for missed pick-points and unintended selections is eliminated. In addition, such an embodiment ensures consistent and reliable playback results.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide various unique aspects. One such aspect allows a user to select a certain point in a macro and change the individual parameters. Further, the user recording the macro has the ability to request user interaction at any point in the macro in addition to the ability to pause a macro during playback. The user may also provide for relative coordinate entry during playback as well as reliable playback of object selection. Further, embodiments of the invention provide the ability to infer object selection for those objects created within a macro. For example, if a macro creates an object and performs an action on the object, embodiments of the invention may recognize that the action is to be performed on the object just created by the macro itself.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for providing input during a playback of a macro, comprising:
    recording a macro comprised of a series of user actions;
    after completing the recording, displaying, on a display device, a representation of the user actions comprised of one or more nodes that each represent one or more of the user actions in the series, wherein the one or more nodes are arranged in a hierarchical manner with each node representing a command and each of one or more subsets of each node comprise a parameter for the command;
    selecting, in the representation, one of the nodes;
    in response to the selecting of one of the nodes, displaying a dialog box, wherein the dialog box comprises one or more user selectable menu options, wherein each menu option defines a different methodology for determining how a value of a parameter of the selected node is determined during playback of the macro;
    configuring the selected node by selecting one of the one or more user selectable menu options defining how a value of a parameter of the selected node is determined during playback of the macro;
    playing back the macro;
    pausing the macro at the selected node;
    obtaining the value in accordance with the configuring selected menu option; and
    continue playing back the macro utilizing the value for the parameter of the selected node.

2. The method of claim 1, wherein the series of user actions comprise creating geometry in a drawing program.

3. The method of claim 2, wherein the defining comprises requesting user input relating to the parameter and the user input comprises an identification of a location in a drawing.

4. The method of claim 2, wherein the defining comprises requesting user input relating to the parameter and the user input comprises a size of the geometry.

5. The method of claim 1, wherein:
    the series of user actions comprises creating multiple geometries in the drawing program; and
    a relative positioning between the geometries created in the drawing is maintained during playback of the macro.

6. The method of claim 5, wherein:
    a vector offset between two of the geometries is generated and stored during the recording; and
    the vector offset is used to maintain the relative positioning during playback of the macro.

7. A computer implemented method for reliably playing back objects selected in a macro comprising:
    (a) recording a macro comprised of a series of user actions, wherein:
        (i) one or more of the user actions comprises a selection of one or more objects displayed on a display device;
        (ii) when the one or more objects are selected, the one or more objects are already existing objects that are displayed in a drawing program; and
        (ii) the one or more objects comprise geometry in the drawing program;
    (b) as part of the recorded macro, storing references to the one or more selected objects in a non-graphical manner, wherein the storing comprises:
        (i) determining whether the one or more selected objects are newer than a most recently created object, wherein the determining is based on object identifiers that are created sequentially for each object; and
        (ii) if the one or more selected objects are newer than the most recently created object, generating and storing one or more offsets as the references, wherein each offset comprises a difference between an object identifier for a most recently created object and one of the selected objects; and
    (c) playing back the macro, wherein objects are selected during playback based on the stored references.

8. An apparatus for providing input during a playback of a macro in a computer system comprising:
    (a) a computer having a memory;
    (b) an application executing on the computer, wherein the application is configured to:
        (i) record a macro comprised of a series of user actions;
        (ii) subsequent to the application recording the macro, display, on a display device, a representation of the user actions comprised of one or more nodes that each represent one or more of the user actions in the series, wherein the one or more nodes are arranged in a hierarchical manner with each node representing a command and each of one or more subsets of each node comprise a parameter for the command;

(iii) select, in the representation, one of the nodes;

(iv) in response to the selection of one of the nodes, display a dialog box, wherein the dialog box comprises one or more user selectable menu options, wherein each menu option defines a different methodology for determining how a value of a parameter of the selected node is determined during playback of the macro;

(v) configure the selected node by selecting one of the one or more user selectable menu options defining how a value of a parameter of the selected node is determined during playback of the macro;

(vi) play back the macro;

(vii) pause the macro at the selected node;

(viii) obtain the value in accordance with the configuring; and (viiix) continue playback of the macro utilizing the value for the parameter of the selected node.

9. The apparatus of claim 8, wherein the series of user actions comprise creating geometry in a drawing program.

10. The apparatus of claim 9, wherein the defining comprises requesting user input relating to the parameter and the user input comprises an identification of a location in a drawing.

11. The apparatus of claim 9, wherein the defining comprises requesting user input relating to the parameter and the user input comprises a size of the geometry.

12. The apparatus of claim 8, wherein:
the series of user actions comprises creating multiple geometries in the drawing program; and
a relative positioning between the geometries created in the drawing is maintained during playback of the macro.

13. The apparatus of claim 12, wherein:
a vector offset between two of the geometries is generated and stored during the recording; and
the vector offset is used to maintain the relative positioning during playback of the macro.

14. An apparatus for reliably playing back objects selected in a macro in a computer system comprising:
(a) a computer having a memory;
(b) an application executing on the computer, wherein the application is configured to:
(i) record a macro comprised of a series of user actions, wherein:
(1) one or more of the user actions comprises a selection of one or more objects displayed on a display device;
(2) when the one or more objects are selected, the one or more objects are already existing objects that are displayed in a drawing program; and
(3) the one or more objects comprise geometry in the drawing program;
(ii) as part of the recorded macro, store references to the one or more selected objects in a non-graphical manner, wherein the references are stored by:
(i) determining whether the one or more selected objects are newer than a most recently created object, wherein the determining is based on object identifiers that are created sequentially for each object; and
(ii) if the one or more selected objects are newer than the most recently created object, generating and storing one or more offsets as the references, wherein each offset comprises a difference between an object identifier for a most recently created object and one of the selected objects; and
(iii) playback the macro, wherein objects are selected during playback based on the stored references.

15. The method of claim 1, wherein:
the selected node is for selecting one or more objects; and
in response to the selecting of the node, the configuring comprises displaying a dialog box; and
the dialog box comprises menu options for:
inserting a message to be displayed to a user;
requesting user input to select the one or more objects during playback;
using a pick first set that utilizes objects that were previously selected as the one or more objects;
macro-created object selection wherein only objects created as part of execution of the macro are selected; and
re-specifying a new selection set for the one or more objects.

16. The apparatus of claim 8, wherein:
the selected node is for selecting one or more objects; and
in response to the selecting of the node, the application is configured to configure the selected node by displaying a dialog box; and
the dialog box comprises menu options for:
inserting a message to be displayed to a user;
requesting user input to select the one or more objects during playback;
using a pick first set that utilizes objects that were previously selected as the one or more objects;
macro-created object selection wherein only objects created as part of execution of the macro are selected; and
re-specifying a new selection set for the one or more objects.

* * * * *